3,135,524
CONTROL FOR PNEUMATIC SUSPENSION
SYSTEM
George W. Jackson and John F. Pribonic, Dayton, Ohio, assignors to General Motors Corporation, Detroit, Mich., a corporation of Delaware
Filed Nov. 4, 1957, Ser. No. 694,171
3 Claims. (Cl. 280—6.1)

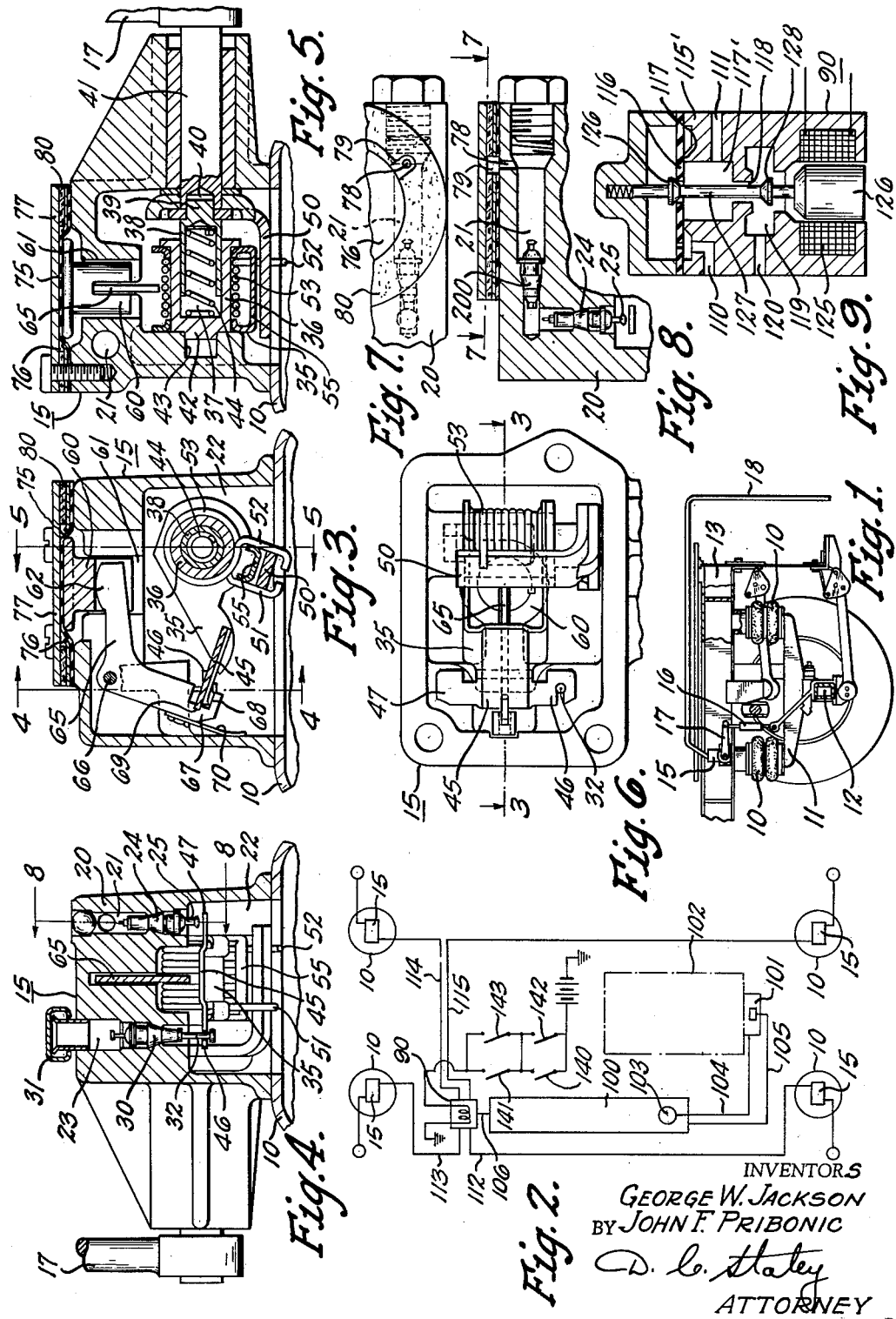

This invention relates to control apparatus for regulating the supply and exhaust of air under pressure to and from an expansible air spring of a pneumatic suspension system for a vehicle.

The invention is particularly adapted for use in connection with a vehicle suspension system in which air springs provide the resilient means for supporting the body of the vehicle upon its running gear or axles. The air spring may be in the form of an air cushion, such as a bellows or a piston and cylinder inflated or charged with a volume of fluid, preferably air, under sufficient pressure to support the body of the vehicle relative to the axle. Because of wide load variations in the average vehicle, such as an automobile, the air pressure within the air springs is varied in response to the load condition so that there is a substantially constant clearance distance provided between the body and the axle of the vehicle. Thus under light load conditions the pressure in the air spring is less than under heavy load condition. Since the load does vary it is necessary to supply air to the air springs to increase the pressure within the air spring when the load increases and when the load decreases to provide for an exhaust of air under pressure from the air springs.

Valve mechanisms are provided to regulate or control the supply of air and exhaust of air to and from the air springs in response to the clearance height between the body and the axle of the vehicle. Such valves may be of the damped, or the undamped type. That is the operating element of the control valve may operate directly on the inlet and exhaust valves that control the flow of air to and from the air spring without any delay action which provides for an immediate response of increase or decrease of air in the air spring. On the other hand the delay type valve is provided with a dashpot arrangement connected with the operating member that actuates the air inlet and exhaust valves so that there is a time delay action between the initiation of the operation of the valve in responding to the change in clearance height before the air is either exhausted or admitted into the air spring. Such delay type of valves are known in the art, one of which is described in the patent to Rossman 2,670,201 issued February 23, 1954.

Under certain conditions of operation of the vehicle it is desirable that the clearance height regulating valve be rendered inactive. Such conditions exist when the vehicle is traveling around a curve or a rapid brake deceleration or rapid acceleration is given to the vehicle. Such conditions change the normal horizontal or level attitude of the body of the vehicle relative to the road so that if the clearance height control valves are allowed freely to admit air into the air spring or exhaust air from the air spring, rapid corrections of the change in attitude of the body of the vehicle will occur with the result that the vehicle body is constantly endeavoring to correct itself in returning to a horizontal position with the result that an uncomfortable feeling is given to the passengers of the vehicle.

It is therefore desirable under some conditions to lock out the clearance height leveling control valve, or hold it in neutral position or render it inactive during periods when the car body tends to change its attitude relative to the axles or the road. Thus if the leveling valve or clearance height control valve is rendered inactive when the vehicle rounds a curve or is decelerated at a rapid rate, the vehicle having been established on a horizontal level relative to the road before entering the curve or before the rapid brake deceleration will remain in this position during the period of curve negotiation or during the period of rapid brake deceleration.

Since the leveling valve or clearance height control valve is rendered inactive during periods of rapid change of attitude of the car body relative to the axles or the road there will be no change of air pressure in the air springs of the pneumatic suspension system and therefore the car body will tend to maintain a normal level condition, subject of course to the normal values of compression of the air under pressure within the air springs.

It is also an object of this invention to provide a control valve and a control system for a pneumatic suspension system for a motor vehicle wherein leveling correction or clearance height correction between the car body and the axle can be obtained at any time the vehicle is in a static or standing position. But once the vehicle is moving and there is any undue tendency toward change in attitude of the body of the vehicle relative to the road the control valve will be rendered inactive to allow any change in the air pressure in the air springs of the suspension system.

To provide a system that will accomplish this operation the leveling valve or clearance height control valve is provided with an air actuated control that is operably connected with the air valve control member of the leveling or height control valve in a manner that when air is present in the supply lines to the height control valves the control valves will be permitted normal operation for leveling or height correction. However, when the air pressure is exhausted from the supply conduit to the respective leveling or height control valves the air responsive control member of the valve will retain the operating member for the air valves of the control in a neutral or inactive position so that the control valve can provide for neither inlet nor exhaust of air to and from the air springs that are controlled by the respective valve.

In providing this arrangement a solenoid valve or other electrically controlled valve is provided in the air supply line that connects an air supply tank with the respective leveling or height control valves so that the respective supply lines can be either supplied with air under pressure from the pressure supply tank or can be exhausted of air. This electrically controlled valve, or solenoid valve, is actuated by a plurality of switches that respond to predetermined established conditions on the vehicle such as closing of the ignition system, or opening of a door, or the effect of centrifugal forces on the body of the vehicle, or for a manual control which will override all of the other switches to allow the operator to provide for a manual selection of control of the leveling or height control valves at any time the ignition switch is on.

Further objects and advantages will become apparent from the following description, reference being had to the accompanying drawings wherein a preferred form of the invention is clearly shown.

In the drawings:

FIGURE 1 is an elevational view of a pneumatic spring suspension adapted for incorporation of the control of this invention;

FIGURE 2 is a schematic view illustrating a control system incorporating features of this invention;

FIGURE 3 is a cross sectional view taken along line 3—3 of FIGURE 6 illustrating a control valve for regulating clearance height between the sprung mass and the unsprung mass of the vehicle;

FIGURE 4 is a cross sectional view taken along line 4—4 of FIGURE 3 illustrating the inlet and exhaust valves of the clearance height control valve;

FIGURE 5 is a cross sectional view taken along line 5—5 of FIGURE 3 illustrating the operating mechanism for the inlet and exhaust valves of the height control valve;

FIGURE 6 is a bottom view of the control valve of FIGURE 3;

FIGURE 7 is a cross sectional view taken along line 7—7 of FIGURE 8 illustrating a bleed connection between the inlet port of the control valve and an air actuated member rendering the leveling control valve active or inactive;

FIGURE 8 is a cross sectional view taken along line 8—8 of FIGURE 4 illustrating the inlet port passage of the clearance height or leveling control valve that incorporates a check valve therein;

FIGURE 9 is a cross sectional view of an electrically operated valve for controlling supply and exhaust of air in the conduits connecting the pressure supply tank with the several leveling or height control valves of the pneumatic suspension system.

In this invention the pneumatic suspension system for a motor vehicle consists of the air spring or air bellows 10 that are carried at one end upon an arm 11 supported on the axle 12. The opposite ends of the air springs or bellows 10 support the frame 13 of the vehicle. Thus the frame 13 is supported by the air springs 10 upon the axle 12 with the frame 13 being maintained in a predetermined clearance height relation relative to the axle 12 depending upon the air pressure contained within the air springs or bellows 10.

Air under pressure is supplied to the air springs 10 or exhausted therefrom under control of the leveling or height control valve 15 that is carried on the frame 13 of the vehicle. When the load in the vehicle increases tending to compress the air springs 10, the control valve 15 will be operated by the linkage system 16 provided between the control arm 17 of the valve 15 and the axle 12 whereby air under pressure will be admitted from the supply line 18 into the air springs 10 to counterbalance the increase load and thereby maintain a predetermined height relation between the frame 13 and the axle 12. Reversely, when the load in the vehicle is lightened, the control valve 15 will be operated by the upward movement of the car frame 13 relative to the axle 12 to operate the valve 15 and thereby exhaust air from the air springs 10 to relieve the pressure within the air springs and allow the frame 13 to settle to the predetermined established normal clearance height relation between the frame 13 and the axle 12.

A leveling or height control valve for accomplishing the foregoing result is more fully illustrated in FIGURES 3 to 8 inclusive. The leveling or height control valve 15 consists of a housing 20 that has an inlet passage 21 for admission of air under pressure into the internal cavity 22 provided in the housing 20 and an exhaust passage 23 that provides for exhaust of air from the cavity 22. The housing 20 is carried upon the upper end of the air spring 10 so that the interior of the housing 20, that is the cavity 22, is continuously open to the interior of the air spring 10 and thereby the same pressure exists in the cavity 22 as exists in the interior of the air spring 10.

An air pressure inlet control valve 24 is provided in the inlet passage 21 normally to prevent passage of air under pressure from the inlet passage 21 into the cavity 22 in the housing 20. This air pressure control valve 24 is preferably of a type known as a "tire valve" having a stem 25 projecting from one end into the cavity 22 in the housing 20 for actuation by an operating member to open the valve 24 and allow air to enter the cavity 22 and thus the air spring 10 when the frame 13 of the car moves downwardly relative to the axle 12.

The exhaust passage 23 is provided with an air pressure control valve 30 that normally prevents exhaust of air from the chamber 22 through the passage 23 into the atmosphere through the filtered opening 31. The valve 30 has a stem 32 that extends into the chamber or cavity 22 whereby the valve 30 is operated by an operating member to open the exhaust valve 30 when the frame 13 of the vehicle tends to rise relative to the axle 12. This valve 30 is also of the "tire valve" type.

The valves 30 and 24 are actuated by an operating member 35 that has a hub portion 36. The hub portion 36 has an axial bore 37 that receives an axle pin 38 having the end 39 thereof supported within an axial bore 40 of the operating arm supporting shaft 41. The supporting shaft 41 carries the operating arm 17 for actuation of the valve 15 in a manner hereinafter described.

The opposite end of the hub 36 has a reduced diameter portion 42 carried in the bore 43 in the housing 20 whereby the portions 42 and 39 support the operating member on a pivot axis that is the same as the axis of the operating supporting shaft 41. A compression spring 44 within the axle member 38 retains the reduced diameter portions 42 and 39 in their respective positions.

The operating member 35 has a platform 45 having the projecting ends 46 and 47 that are adapted to engage the stems 32 and 25 respectively of the valves 30 and 24 whereby the valve 24 is operated upon upward movement of the platform 45 whereas the valve 30 is operated upon downward movement of the platform, as viewed from FIGURE 4.

The operating support shaft 41 that is journalled in the housing 20 carries an axially extending arm 50 that is retained between oppositely directed ends 51 and 52 of a torsion spring 53 carried on the hub 36. An arm 55 is carried on the actuating member 35 also axially of the shaft 41 and positioned between the opposing ends 51 and 52 of the torsion spring 53 so that oscillating movement of the arm 50 as effected by rotation of the shaft 41 will cause the arm 55 to osciliate and thereby effect vertical reciprocal movement of the platform 45 to actuate the valve 30 and 24.

From the foregoing description it will therefore be seen that when the shaft 41 is rotated in either direction, the platform 45 of the operating member 35 will move from the neutral position illustrated in FIGURE 4 so that upward movement of the platform will open the valve 24 to allow air under pressure to enter the air springs and thereby counterbalance an increased load in the vehicle whereas counter rotation of the shaft 41 will effect downward movement of the platform 45 to open valve 30 and allow exhaust of air from the air springs 10 to counteract a decrease in load in the vehicle. The operation of the leveling or height control valve 15 will thereby maintain a predetermined clearance height relation between the frame 13 and the axle 12 of the vehicle. The valve heretofore disclosed and described to maintain clearance height relation between the frame and axle of the vehicle is of a type known as a non-delay valve in view of the fact that no damping device is connected with the arm 35 to retard its movement relative to the movement of the arm 50 so that the arm 55 and the arm 50 move concurrently in direct response to oscillation of the operating shaft 41 as effected by the arm 17 connecting the shaft 41 with the axle 12 of the vehicle so as to reflect any change in clearance height relation between the frame 13 and the axle 12. When using the valve of the type heretofore described to control the height relation between the frame and the axle of the vehicle, it is desirable under certain conditions to render the valve ineffective to supply air to the air spring or exhaust air from the air spring. Such conditions occur when a rapid deceleration stop is made whereby the front end of a vehicle tends to dip downwardly whereby an increase of load is effected on the air springs with the result that the control valve 15 would consider that a permanent increase in load had been applied to the front air springs and therefore calls for admission of air under pressure into the air springs to correct for the apparent increase in load. As soon as the rapid deceleration was stopped, the increase in pressure in the forward air springs would tend to raise the front end of the vehicle above a normal clearance height relation because there was no actual increase in load so that then the control valve would be required to exhaust air from the forward air springs to allow the front end of the vehicle to return to a normal clearance height relation between the frame and the axle of the vehicle. This constant hunting of the control valve leads toward instability of the vehicle so that at the time of the rapid deceleration it is desirable to render the control valve 15 inactive and thereby eliminate any change in air pressure in the forward air springs as a result of a false operation of the valve, or at least operation of the valve feeling a false condition.

The same type of situation is created when a rapid acceleration is made, only in this instance the rear end of the car tends to dip downwardly with the result that if the valve 15 were not inactivated air pressure would be supplied into the rear air springs which would again have to be exhausted from these springs when the vehicle leveled up. Here again a hunting condition of the valve in effecting a change of air pressure in the air springs tends toward instability of the vehicle.

A third condition arises when the vehicle enters a curve wherein centrifugal force tends to effect rotation of the car body toward the outside of the curve with the result that an angle of inclination is effected in the car body relative to the road or relative to the axles of the vehicle. Here again if the control valves 15 were allowed to remain active fully there would be an immediate response of increasing air pressure in the air springs on one side of the vehicle and exhausting air pressure from the air springs on the opposite side of the vehicle which conditions would have to be immediately reversed upon the car entering a straightaway with the result that a side sway is given to the car body that tends to establish an unstable condition.

Under the foregoing conditions therefore it is desirable to render the leveling or height control valves 15 inactive, or to lock them out against actuation during periods of unusual change in attitude of the vehicle relative to the axles or relative to the road.

In this invention an air pressure actuated member is provided for rendering the leveling or height control valves 15 inoperative or ineffective or to lock out the valves during the existence of the aforementioned conditions. This air pressure control device is actuated by the existence of air pressure in the supply lines to the several leveling or height control valves 15 so that the control valves will be effective or active whenever air under pressure is in the supply lines to the several leveling or height control valves 15. However, when air is exhausted from the supply lines to the several leveling or height control valves 15 the air pressure actuated control will lock out the control valves 15 or render them inactive for supplying air to the air springs or exhausting air therefrom.

The regulation of the supply of air to the supply conduits for the valves 15 or exhaust of air from these conduits is controlled by an electrically operated valve that responds to predetermined established conditions on the vehicle under control of certain electric switches whereby the electrically operated valve can be energized and de-energized to either supply air to the supply conduits for the leveling valves 15 or exhaust air therefrom depending upon whether the electric switches are open or closed. Such an arrangement is disclosed in FIGURE 2 and will be more fully described hereinafter.

The air operated control means that renders the leveling valve ineffective, or locks the air valve out from operation consists of a plunger 60 journalled in a guide opening 61 in the housing 20. The plunger 60 engages one end 62 of a bell crank lever 65 that is pivoted to the housing by the pivot pin 66. The opposite end 67 of the bell crank lever 65 has a rectangular notch 68 cut therein with a second deeper notch 69 provided in the rear wall of the notch 68. The platform of the member 35, that is the platform 45 is adapted to be engaged by the notch 69, as shown in FIGURE 3 whereby when the bell crank lever 65 is in the position shown in FIGURE 3 the operating member 35 is locked in neutral position so that the valve 15 is rendered inactive for supply of air to or exhaust of air from the air springs. A leaf spring 70 urges the bell crank lever 65 in a counterclockwise direction to insure engagement of the notch 69 with the left hand edge of the platform 45.

The plunger 60 is operated by a diaphragm member 75 that operates within a chamber 76 provided between the diaphragm 75 and the cover plate 77. The chamber 76 forms an air chamber above the diaphragm 75 and is connected with the inlet passage 21 in the housing 20 by means of a vent port 78 and a notch 79 cut inwardly toward the chamber 76 in the gasket member 80. Thus, when air under pressure stands in the inlet passage 21, air under pressure also stands in the chamber 76 and therefore urges the plunger 60 downwardly to rotate the bell crank lever clockwise and thereby release the left hand edge of the platform 45 from the notch 69 to allow freedom of movement of the platform 45 within the limits of notch 68 to operate the valves 30 and 24 in the manner heretofore described. However, whenever air is exhausted from the chamber 76, which means that air has been exhausted from the inlet passage 21, then the spring 70 will urge the bell crank lever 65 in a counterclockwise direction so that whenever the platform edge 35 passes across the notch 69 the edge of the platform will be received by the notch 69 with the result that the operating member 35 is locked in neutral position to prevent any actuation of the valves 30 and 24. The air pressure control means, comprising the diaphragm 75, the plunger 60 and the bell crank lever 65 is rendered active or inactive depending upon the position of an electrically operated solenoid valve 90 that is connected in the air supply lines between the air supply tank 100 and the air springs 10.

As most spcfically shown in FIGURE 2 in which there is a schematic illustration of the air pipe line connections between the air springs and a supply tank and an electrical system for operating the electric solenoid valve 90, the air springs 10 are represented by the circles 10 and the respective leveling or height control valves 15 are represented by small blocks within the circles 10.

An air pressure supply reservoir 100 receives air under pressure from a compressor 101 driven by the vehicle engine 102. A pressure blow off valve 103 permits re-return of air pressure above the predetermined value to the compressor through the line 104, the line 105 being the supply line between the compressor 101 and the air pressure supply tank 100. The supply tank 100 is connected by a conduit 106 with the electric solenoid valve 90, the conduit connecting with the inlet passage 110, as shown in FIGURE 9. The solenoid valve 90 has one or more outlet passages 111 for supplying air to the conduit lines that connect with the leveling control valves 15. As shown in FIGURE 2 independent supply lines 112, 113, 114 and 115 connect the several leveling control valves 15 with the solenoid valve 90.

When the solenoid valve is energized, air under pressure will be supplied from the supply tank 100 into the several supply lines to the leveling control valves and when the solenoid is de-energized the supply lines 112, 113, 114 and 115 will be exhausted of air pressure, being connected with atmosphere at that time through the solenoid valve 90.

The solenoid valve 90, such as that illustrated in FIGURE 9, comprises a body 115' that has the inlet passage 110 and the outlet passage 111. A diaphragm 116 carried on the seat 117 when the valve is de-energized closes the inlet port 110 from the outlet port 111. The outlet port 111 connects with the axial chamber 117' that connects through a port 118 with an exhaust chamber 119 that has a port passage 120 connecting the chamber 119 with the atmosphere.

The solenoid valve 90 includes an electrically operated coil 125 within which there is placed an armature 126 that carries a valve stem 127, a valve member 128 being located within the chamber 119 closing the passage 118 when the valve 90 is energized thereby cutting off the connection between the exhaust port 120 and the port 111 that connects with the supply lines 112, 113, 114 and 115.

When the valve 90 is energizzed upon energization of the electric coil 125 the diaphragm 116 is allowed to move upwardly to permit air under pressure to pass from the port 110 into the chamber 117' and thence through the outlet port 111 to the several leveling valves 15. A valve member 126 is provided on the valve stem 127 to effect a balancing of the diaphragm 116.

From the foregoing description it will therefore be apparent that when the solenoid valve 90 is energized air under pressure will be supplied from the tank 100 to the several leveling valves 15 for the air springs 10 which concurrently will permit air pressure to enter the chamber 76 above the diaphragm 75 of the leveling valve to actuate the bell crank lever 65 and disengage the same from the platform 45 and thereby allow the platform 45 to operate the valves 30 and 24 of the leveling valve 15.

However, when the solenoid is de-energized the several supply lines 112, 113, 114 and 115 will be connected to atmosphre through the port 111 and the port 120, the valve 128 now being in the position shown in FIGURE 9, so that with atmosphere pressure standing in the supply lines to the leveling valves 15 the bell crank 65 of the leveling valve 15 will again assume the position shown in FIGURE 3 to lock the valve in neutral position and thereby prevent operation of the valves 30 and 24.

To render the leveling control valves or height control valves 15 inactive in response to certain predetermined established conditions of the vehicle, the electric switches 140, 141, 142 and 143 are provided in an electrical circuit as illustrated in FIGURE 2. Switch 140 is a switch that responds to the action of inertia forces of acceleration or of deceleration or of centrifugal forces on the vehicle such that when the vehicle is under a rapid deceleration, or a rapid acceleration, or under a condition of going into a curve or roll, the switch 140 will open, this switch being a normally closed switch. Switch 141 is in the ignition circuit and is closed when the ignition circuit is closed. Switch 142 is a manually operated switch that is normally open and can be closed manually by the operator of the vehicle to provide for operator control of energization of the solenoid 90 and thereby override the other controls. Switch 143 is a door actuated switch that is normally open when the door is closed. The switches just described provide an arrangement whereby the leveling valves 15 are rendered active at any time the vehicle is in a static or standing position for at this time the switch 140 will be closed, and even though the ignition switch 141 may be opened, whenever a door is opened to close switch 143 electric circuit will be made to the electric solenoid valve to energize the same and thereby shift the solenoid from the position shown in FIGURE 9 to the position in which port 110 is connected with port 111 and allow the air under pressure from the tank 100 to be supplied to the valves 15 for height correction purposes. However when the door of the vehicle is then closed after loading or unloading switch 143 will be opened so that at this time the solenoid 90 will be de-energized and the supply lines to the several leveling valves will be exhausted so that the leveling valve will be locked in neutral position as heretofore described. If the vehicle has previously been loaded heavily, a relatively high pressure will be in the air springs. Thus if the passengers of the vehicle unload quickly the vehicle will tend to rise above the normal clearance height relation between the body and the axle. Under this circumstance the forward edge of the platform 45 will be above the notch 69 in the bell crank lever 65. Thus the exhaust valves of the air spring control valves can be opened by the platform 45 to allow exhaust of air until the forward edge of the platform 45 passes over the notch 69 wherein the bell crank lever 65 will rotate counterclockwise to effect engagement of the notch 69 with the platform 45 and thereafter hold the control valve in a de-activated or neutral position so long as the car doors are closed and air is exhausted from the upper side of the diaphragm 75.

A check valve 200 is placed in the inlet passage 21 ahead of the inlet control valve 24 to prevent any loss of air from the air springs in the event the inlet valves 24 should be open for any reason.

When the ignition switch 141 is closed and switch 140 is also closed, being normally closed under normal circumstances, leveling correction can occur because solenoid 90 will be energized. However, at any time the vehicle enters an attitude condition that is above a predetermined value, such as in a rapid deceleration or rapid acceleration or in rounding a curve, the action of centrifugal force on the switch 140 will open the switch and thereby deactivate the circuit to the electric solenoid, at which time the air under pressure will be exhausted from the chamber 76 of the leveling valves to allow the valves to be retained in neutral or inactive position during this condition of change of attitude of the vehicle.

At any time the operator desires to provide for a leveling control separate from the automatic controls heretofore described switch 142 is closed manually to override the other controls so that when the ignition switch is closed the solenoid 90 will be energized and the valves 15 will be rendered active.

While the form of embodiment of the invention as herein disclosed constitutes a preferred form, it is to be understood that other forms might be adopted as may come within the scope of the claims which follow.

What is claimed is as follows:

1. Control means for regulation of the supply and exhaust of air under pressure to and from an expansible air spring disposed between a sprung mass and an unsprung mass of a vehicle to maintain a regulated clearance height between the sprung and the unsprung mass of the vehicle and retain control over the level condition of the vehicle, including, air pressure control means having passage means therein for conducting air pressure to and from an air spring and including valve means regulating said air flow through the said passage means and further including operating means for the valve means adapted for actuation by relative movement between the sprung mass and the unsprung mass of a vehicle to effect regulated flow of air through said passage means in response to clearance height changes between the said sprung mass and the unsprung mass, stop means engageable by said operating means to control maximum movements thereof on either side of a neutral position and having one position in which said operating means engages the said stop means to limit maximum movement of the operating means on either side of a neutral position and a second position in which said stop means engages said operating means to retain said operating means in a neutral position, and air actuated means operably connected with said stop means and responsive to the presence or absence of air pressure at the inlet side of said air pressure control means to actuate the same normally to hold said stop means in its said first position so long as air pressure is present at the inlet side of said air pressure control means and to provide for said stop means to assume its said second position whenever air pressure is absent from the inlet side of said air pressure control means during movement of the vehicle.

2. Control means for regulation of the supply and exhaust of air under pressure to and from an expansible air spring disposed between a sprung mass and an unsprung mass of a vehicle to maintain a regulated clearance height between the sprung and the unsprung mass of the vehicle and retain control over the level condition of the vehicle, including, air pressure control means having passage means therein for conducting air pressure to and from an air spring and including valve means regulating said air flow through the said passage means and further including operating means for the valve means adapted for actuation by relative movement between the sprung mass and the unsprung mass of a vehicle to effect regulated flow of air through said passage means in response to clearance height changes between the said sprung mass and the unsprung mass, stop means engageable by said operating means to control maximum movements thereof on either side of a neutral position and having one position in which said operating means engages the said stop means to limit maximum movement of the operating means on either side of a neutral position and a second position in which said stop means engages said operating means to retain said operating means in a neutral position, and control means responsive to an angular change in attitude of the vehicle from a horizontal level condition to release air pressure from the inlet side of said air pressure control means and thereby operate said air actuated means to dispose said stop means in its said second position so long as the absence of air pressure exists at the inlet side of said air pressure control means during movement of the vehicle.

3. Apparatus in accordance with claim 2 in which the said control means responsive to the angular change in attitude of the vehicle comprises electrical control means actuated by displacement of the vehicle from a horizontal level condition to exhaust air pressure at the inlet side of said air pressure control means during the said change in angular attitude of the vehicle.

References Cited in the file of this patent
UNITED STATES PATENTS

| | | |
|---|---|---|
| 1,585,833 | Down | May 25, 1926 |
| 1,816,075 | Down | July 28, 1931 |
| 2,844,384 | Jackson | July 22, 1958 |
| 2,848,249 | Bertsch | Aug. 19, 1958 |
| 2,888,272 | Fletcher | May 26, 1959 |
| 2,950,124 | Pribonic | Aug. 23, 1960 |